United States Patent [19]
Smith et al.

[11] Patent Number: 5,829,053
[45] Date of Patent: Oct. 27, 1998

[54] BLOCK STORAGE MEMORY MANAGEMENT SYSTEM AND METHOD UTILIZING INDEPENDENT PARTITION MANAGERS AND DEVICE DRIVERS

[75] Inventors: David Lee Smith, San Francisco; William J. Keenan, Redwood; Steven James Szymanski, Cupertino, all of Calif.

[73] Assignee: Apple Computer, Inc., Cupertino, Calif.

[21] Appl. No.: 644,412

[22] Filed: May 10, 1996

[51] Int. Cl.$^6$ .............................. G06F 12/00; G06F 12/10
[52] U.S. Cl. .......................... 711/202; 711/209; 711/173; 711/114; 395/681
[58] Field of Search ................................ 711/5, 202, 203, 711/209, 129, 153, 173, 114; 395/681

[56] References Cited

U.S. PATENT DOCUMENTS

| | | | |
|---|---|---|---|
| 5,117,350 | 5/1992 | Parrish et al. | 711/1 |
| 5,129,088 | 7/1992 | Auslander | 711/1 |
| 5,546,557 | 8/1996 | Allen et al. | 711/111 |

OTHER PUBLICATIONS

"The Raid Primer" published by the RAID Advisory Board, Inc., St. Peter, Minnesota, Mar. 1994.

*Primary Examiner*—Glenn Gossage
*Attorney, Agent, or Firm*—Burns, Doane, Swecker & Mathis, L.L.P.

[57] ABSTRACT

A memory management system and method of managing a memory system are disclosed. The memory management system includes a plurality of physical storage media and a memory manager for generating virtual storage devices or "stores," with one or more first storage devices each having a corresponding first mapping plug-in, or device driver, associated with the plurality of physical storage media. Each first device driver scans its corresponding first storage device to determine its partitioning format and generates one or more second virtual storage devices from a partition map stored in the partitioning plug-in, or partition manager, associated with the corresponding first storage device, each second virtual storage device having one or more second partitioning formats, a second partition manager and second device driver. The first and second partition managers are independent of the first and second device drivers. The separation of disk driver and partition manager functions allows for the nesting of partition formats and avoids the replication of partitioning codes. The physical storage media may include at least one redundant array of independent disks (RAID), and the first device driver may be a small computer systems interface (SCSI) associated with the physical storage device.

13 Claims, 5 Drawing Sheets

BLOCK STORAGE MEMORY MANAGEMENT SYSTEM AND METHOD UTILIZING INDEPENDENT PARTITION MANAGERS AND DEVICE DRIVERS

FIELD OF THE INVENTION

The present invention relates generally to block storage memory systems. More particularly, the present invention provides for a partitioning scheme for a block storage memory system which allows the nesting of partitioning formats and avoids replication of partitioning codes.

BACKGROUND OF THE INVENTION

The present application is related to the copending, commonly assigned application Ser. No. 08/644,317 entitled "Block Storage Memory List", which was filed on the same date as the present application and which is incorporated herein by reference.

Many types of memory storage devices are known, such as flash random access memory (RAM) cards and multigigabyte disk arrays, each with different interfaces. All of these devices share common characteristics that can be abstracted out into a single interface which effectively hides the differences between the device interfaces. Additionally, many different partitioning formats can be used to describe how each device is divided into sub-devices; the details of these partitioning formats can be abstracted to form a single interface.

A block storage memory system provides the abstractions and single interface to avoid the need to compensate for different device interfaces and partitioning formats. This allows for the easy addition and qualification of new devices and partitioning formats.

Specifically, a block storage memory system abstracts the different characteristics of real, physical, storage devices to provide a single, consistent interface to "virtual" storage devices which are abstract representations of physical storage devices. The block storage memory system partitions and aggregates storage devices to create a virtual device of the appropriate size for an application.

Known block storage models and interfaces are typically directed to disk and disk-like devices with random-access capabilities.

A typical block storage system includes virtual storage devices, multiple auto-recognized partitioning formats and automated media changers.

Virtual storage devices, or "stores", are abstract representations of real disk devices. They provide a relatively simple but powerful interface of randomly accessible fixed-sized "blocks" of data. The blocks of data in a store must be stored somewhere, either in a real device or in one or more other stores. Of course, the chain of virtual devices must ultimately include a store attached to a real device or the data could not be stored.

If the only option were for a virtual store to have a 1-to-1 mapping of blocks to its parent store, virtual stores would have limited utility. However, a store can be mapped to a portion of another store or multiple stores can be aggregated together and mapped into a single store. The relationship between stores and between a store and a physical device is referred to as a "mapping." The algorithm used to perform the mapping is changeable and is typically provided by a simple "mapping plug-in" module associated with each store. Using different algorithms to map the blocks allows for the software implementation of devices such as RAID (redundant array of independent disks) or encrypted devices. As will be appreciated by those skilled in the art, RAID is a storage technology in which an array of disks appear to a user to be equivalent to a single disk. By scattering data across a number of individual disks, and storing redundancy information separately from the data, the system can continue to function without loss of data if an individual disk in the array fails. The redundancy information can be a copy of the data or other information that can be used to reconstruct data stored on failed disk. RAID technology is described in more detail in "The RAID Primer" (1994) published by the RAID Advisory Board, Inc. St. Peter, Minn., which is incorporated herein by reference.

Partition maps are simple databases of a virtual device that describe how the virtual device is partitioned into sub-devices. There are many known partition map formats, and often a partition map format is more closely related to a specific machine or operating system than a file system format; many operating systems support multiple file system formats but few support multiple partitioning formats. Most operating systems can use the information in a partition map to produce a number of virtual devices corresponding to the partitions described in the map. Most operating systems, however, allow only this two-level hierarchy of physical devices and virtual devices. Partition maps are typically implemented by a single integrated disk or device driver and partition manager. The partition manager includes partition code which enables the partition to read the partition map data and perform the necessary partitioning. The conventional integrated device driver and partition manager requires significant amounts of partition code to be copied and stored in each partitioned storage device, reducing the efficiency of the memory system.

Input/output (I/O) operations in a computer system are typically performed between an I/O device and some portion of the system memory. There is currently no standard way for a user-level application to determine a particular portion of the memory involved in an I/O operation. Memory lists are abstract lists of data created from a set of address ranges defining a subset of a memory range. Each item in a memory list represents an address or address range in the memory range. Memory lists are used to store and retrieve physical and virtual page addresses for performing I/O operations. Typically, I/O operations in a block storage memory system are performed by remapping the items in the memory list to generate physical addresses necessary to perform the I/O operation. If the memory system includes data scattered across several physical devices, such as in a RAID storage system described above, the memory list must necessarily be copied for each physical memory device containing data addresses included in each memory list. It will be appreciated that as the complexity of the block storage memory system increases, extensive remappings and copying of memory lists will typically be required, thereby decreasing the speed and efficiency of the memory system. It would be desirable to reduce the need for copying and remapping, and thereby improve the performance of the system.

SUMMARY OF THE INVENTION

According to exemplary embodiments, data can be retrieved from an arrangement of virtual storage devices by first identifying a physical or logical storage device and a corresponding first mapping plug-in (device driver) associated with the identified storage device. The first device driver scans the storage device to determine its partition formats. A first partition manager associated with the storage device contains a first partition map describing the first storage device, and a first partition code to read the first partition map data and generate a second virtual storage device having a second partitioning format and second device driver from the first partition map. The device driver and partition manager for each storage device are separated to allow the nesting of partition formats and avoid the replication of partitioning codes.

By providing for partitioning managers independent from the device drivers for each partitioned device in each hierarchical level of a block storage memory, it is no longer necessary to inefficiently replicate and store irrelevant partition code in the partitioning managers of each partitioned device.

BRIEF DESCRIPTION OF THE DRAWINGS

The present invention will be better understood upon reading the following Detailed Description of the Preferred Embodiments in conjunction with the accompanying drawings, in which like reference indicia indicate like elements, and in which:

FIG. 7 is a flowchart describing a method of creating and using a block storage memory list according to an embodiment of the present invention.

DETAILED DESCRIPTION OF THE PREFERRED EMBODIMENTS

The present invention is directed to a memory management method and system incorporating partitioned storage devices having separate partition managers and device drivers. An exemplary computer system for implementing the present invention will now be described with respect to FIG. 1. The computer system includes a computer 10 having a variety of external peripheral devices 12 connected thereto. The computer 10 includes a central processing unit (CPU) 14 and associated memory. This memory generally includes a main memory which is typically implemented in the form of a random access memory (RAM) 16, a static memory that can comprise a read only memory (ROM) 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26 such as a mouse, trackball, pen or the like. A display device 28, such as a cathode-ray tube (CRT) monitor or an liquid crystal display (LCD) screen, provides a visual display of the information that is being processed within the computer, for example the contents of a document or a computer-generated image. A hard copy of this information can be provided through a printer 30, or similar such device. Each of these external peripheral devices communicates with the CPU 14 by means of one or more input/output ports 32 on the computer.

Figure 1:
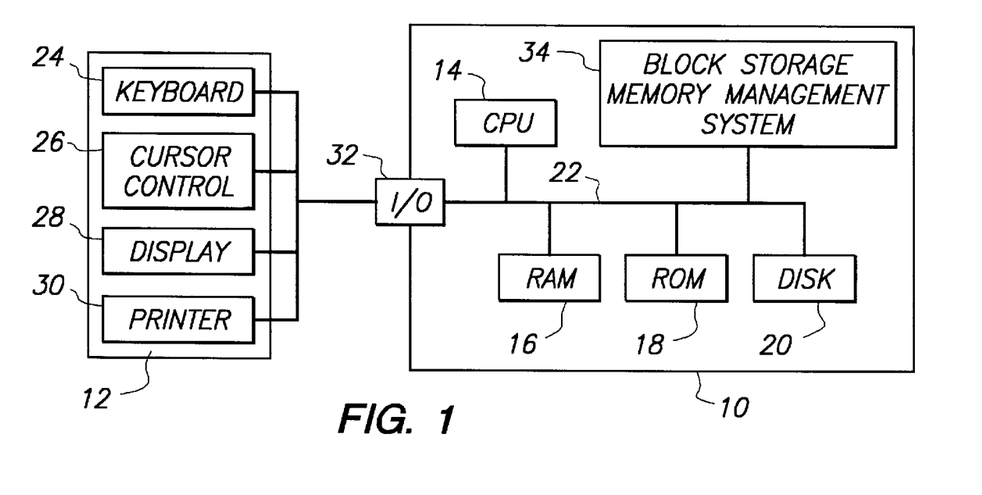
FIG. 1 is a block diagram of an exemplary computer system.

The memory disk 20 can include multiple physical storage devices, including one or more redundant arrays of independent disks (RAIDs), as described previously.

Figure 2:
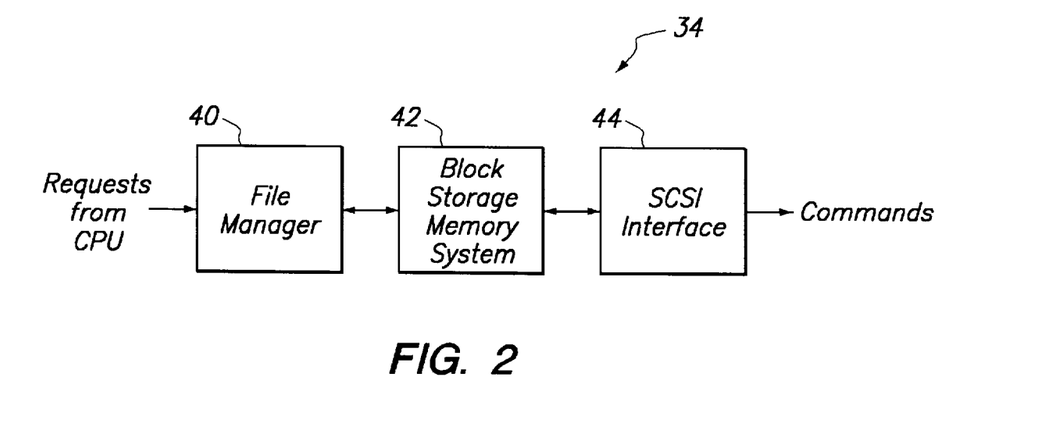
FIG. 2 is a block diagram of a block storage memory management system suitable for implementing the present invention.

Referring now to FIG. 2, a block storage memory management system 34 suitable for implementing the present invention in the computer system of FIG. 1 is shown. The system includes a file manager 40 for receiving requests for I/O operations from CPU 14, a block storage memory system 42 for receiving the requests from file manager 40 and converting the requests into physical commands instructing data to be retrieved from a source and transmitted to a destination, and a Small Computer System Interface (SCSI) interface 44 for receiving the physical commands and supplying the commands to the desired source and destination. The block storage memory system 42 includes virtual representations of some portions, or all, of RAM 16, ROM 19, or disk 20.

Figure 3:
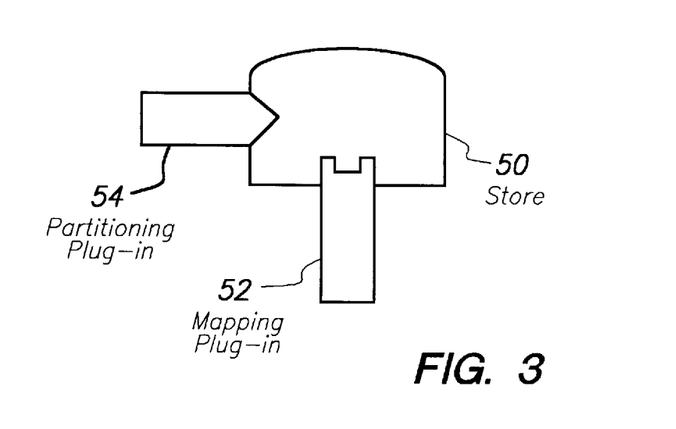
FIG. 3 is an exemplary store in a block storage memory system.

Referring now to FIG. 3, an exemplary store in a block storage memory system is shown. A store is a linearly addressable set of blocks of data contained in the memory of the computer system of FIG. 1. The size of each block in a set can vary between stores, but any individual store includes blocks of only one size (or "granularity"). Stores can be physical stores, which map to physical storage locations in the computer system memory in a one-to-one correspondence, or logical (virtual) stores, which map blocks from other logical or physical stores into the address range of the logical store. The store includes a core data structure 50 and a mapping plug-in module 52. The store can also include a partitioning plug-in module 54 (partition manager) if it is partitioned into sub-stores.

A "mapping" defines the blocks of data that a store will return when the store is asked for block x. The mapping of logical blocks to physical blocks in a physical store is defined by its associated mapping plug-in 52. When a mapping is made between two stores, the store which is making a block of data available is called the parent, while the store which translates the block address is called the child store. The mapping plug-in module 52 translates a block address between a child store and its associated parent store(s), or between a physical store and its associated physical device. Both types of mapping plug-ins provide the same interface to their associated store.

The physical store mapping plug-in preferably functions as a device driver for the associated physical storage device, and translates block requests into operations on the physical device. The terms "mapping plug-in" and "device driver" are used interchangeably herein. A logical store mapping plug-in is typically simpler than a physical store mapping plug-in. The logical store plug-in preferably handles partitions and logical store needs. Complex storage systems incorporating one or more RAID arrays, however, may require more complex logical store mapping plug-ins.

Partition maps are tables which describe how blocks of data in a virtual storage device are organized into sub-storage devices. Since block storage allows storage devices to be both subdivided and aggregated, the relationship between storage devices is referred to as mapping, as described above; the mapping information is stored in a partition map.

Partitioning plug-ins maintain a store partition map and partition codes necessary to read the partition map and generate the partitions of the store. The partition code information is extracted from the store, and determines whether and how child stores will be created from the parent store. Both logical and physical stores can have partition plug-ins (and hence partition maps) associated with them; however, not all stores have partitioning plug-ins associated with them. Mapping plug-ins scan their associated stores to identify the partitioning format of the store. After recognizing the format, the partitioning plug-in generates the next hierarchical layer of the block storage memory, and the partitioning process is repeated as needed. This process can be referred to as the recursive matching of partition managers.

It will be appreciated that the present invention uses a distributed storage system configuration. All the information about where a specific device or piece of media fits in the storage system is contained within the device. There is preferably no central configuration file that maps devices to file systems or other users of the storage. This approach enables the block storage system to be "plug 'n play" or "unplug 'n play"; in other words, substantially no user action is required when a physical storage device is attached to or removed from the system.

According to the present invention, the virtual devices contain partition maps, which allows the hierarchy of virtual devices to be extended indefinitely. The process of building up ("instantiating") a hierarchy of stores according to the present invention is done automatically as follows. First, a device and an associated mapping plug-in (device driver) are identified. Then, the device driver scans the device (the "parent" store) for partition formats and determines if a partition map is associated with the device driver. The partition map (if any) is used to generate "child" stores and the process is repeated for the child stores. In this manner, the block storage hierarchy of logical devices is generated by a device driver that can recognize and interact with the device, from a minimal amount of information stored outside the device.

Figure 4A:
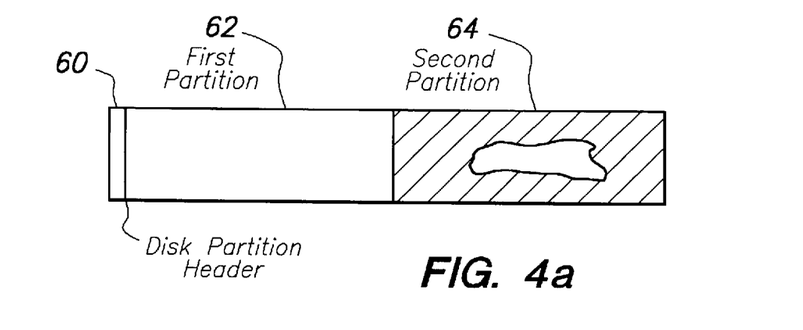
FIGS. 4a–4b show an exemplary partitioning scheme and corresponding hierarchical structure, respectively.
Figure 4B:
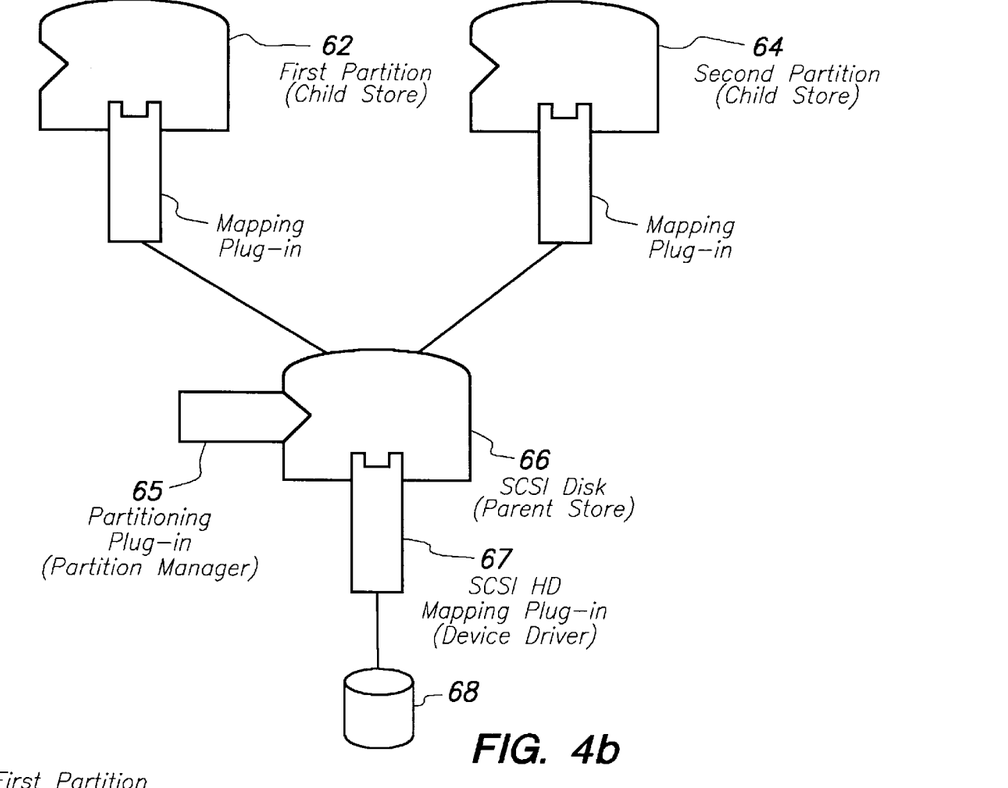

Exemplary store relationships will now be shown and described. It will be appreciated that in the following diagrams, the child stores are drawn above the parent stores, showing the flow of control from top to bottom. Referring now to FIGS. 4a and 4b, an exemplary partitioning scheme for partitioning operating systems on a SCSI (small computer system interface) hard disk, and a corresponding store hierarchy, respectively, are shown. The partition scheme shows the device partitioned into a disk partition header 60, a first partition 62, and a second partition 64. The partitions 62 and 64 can define separate operating systems, for example.

The bottom-most store 66 in FIG. 4b is the parent store which is connected to SCSI hard disk 68. A SCSI hard disk mapping plug-in 67 is associated with store 66 which communicates via a SCSI bus to the hard disk 68, but is shown as directly connected to the disk 68 for simplicity in the diagram. The two child stores 62 and 64 have standard mapping plug-ins associated with them, but have no partitioning plug-ins, since these stores contain no partition maps.

Conventionally, partition maps are implemented using a disk driver as the partition manager, thus requiring a copy of the partition code to be stored in the disk driver at each hierarchical layer. According to an aspect of the present invention, the partition manager (partitioning plug in) 65 and disk driver (mapping plug-in) 67 are separated, as shown in FIG. 4b. The separation of the partition manager and disk driver, and the recursive matching of partition managers, as described above, allow partition formats to be nested; that is, separate independent partition managers associated with stores at different hierarchical levels can be provided with individual partition codes tailored to implement the partitioning necessary at each hierarchical level, as will now be described.

Figure 5A:
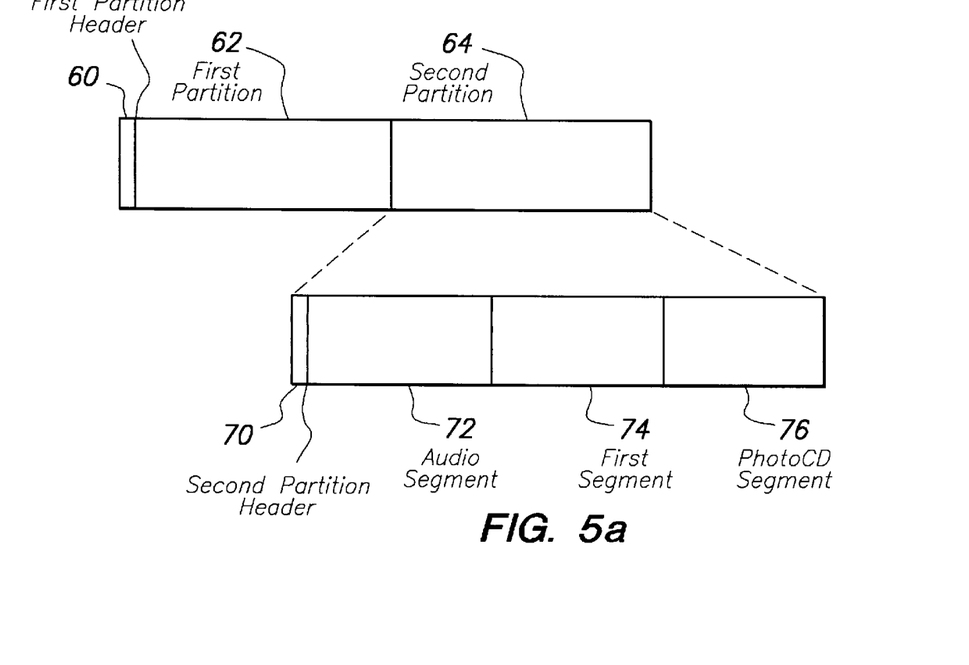
FIGS. 5a–5b show a nesting of partitioning formats and corresponding hierarchy, respectively.
Figure 5B:
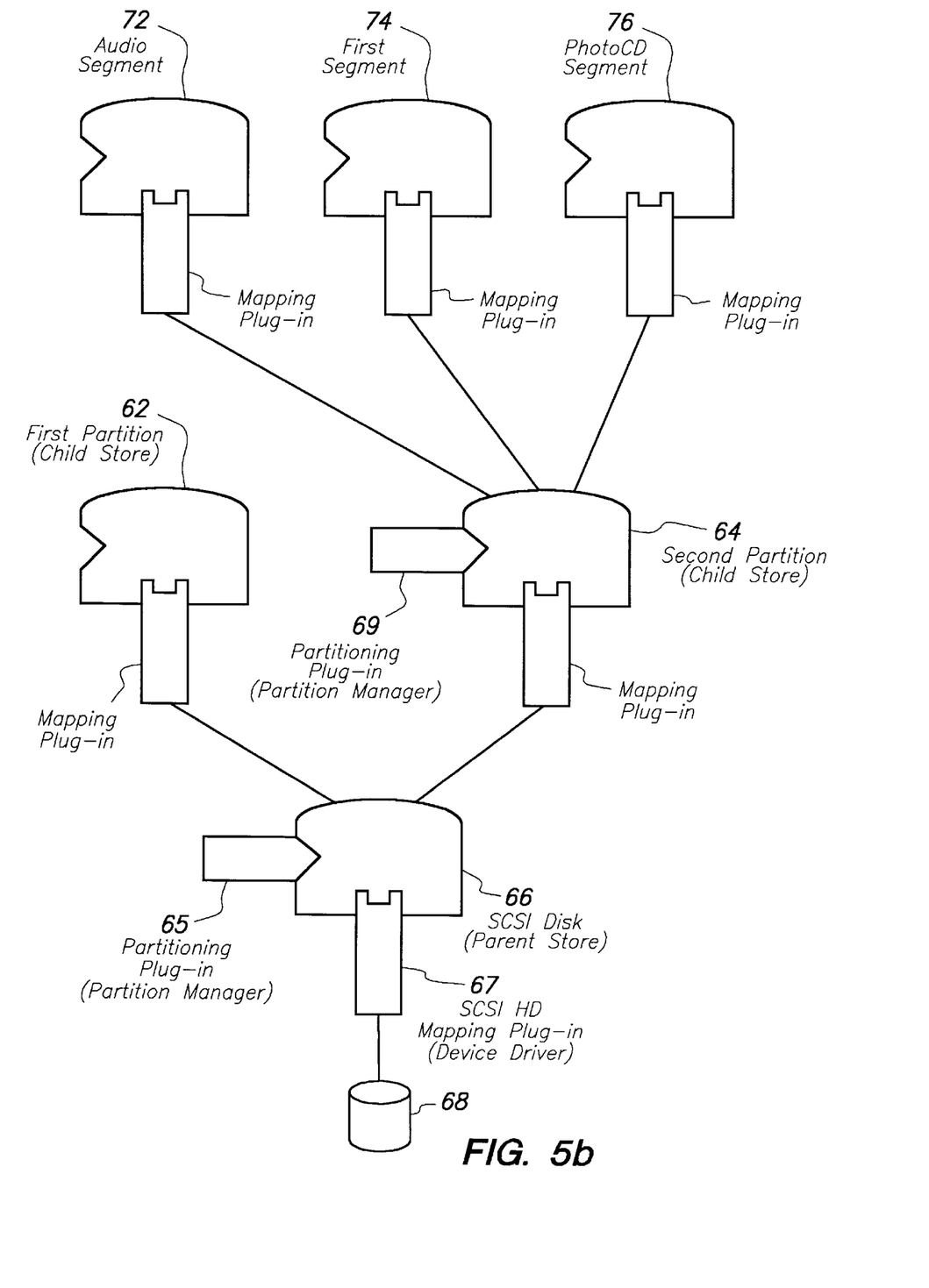

Referring now to FIGS. 5a–5b, a nesting of partitioning formats and corresponding hierarchy, respectively, are shown. The disk shown in FIG. 5a is a SCSI hard disk partitioned into a first partition 62 and a second partition 64, which is partitioned into audio, first and PhotoCD segments 72, 74, and 76, respectively. If the second partition size is chosen to correspond to the size of a compact disc read-only memory (CDROM), a simple block copy can be used to produce a master copy of a recordable compact disk after any necessary editing is performed on the hard disk. The store hierarchy resulting from this configuration is shown in FIG. 5b. Since the second partition 64 incorporates further partitions, it is provided with a second partition manager 69 which is independent of first partition manager 65. The independent partition managers avoid the need to replicate the same partition code in each, thereby increasing the efficiency of the memory system. It will be appreciated that as the number of hierarchical layers is increased, so is the improvement of the system.

Figure 6:
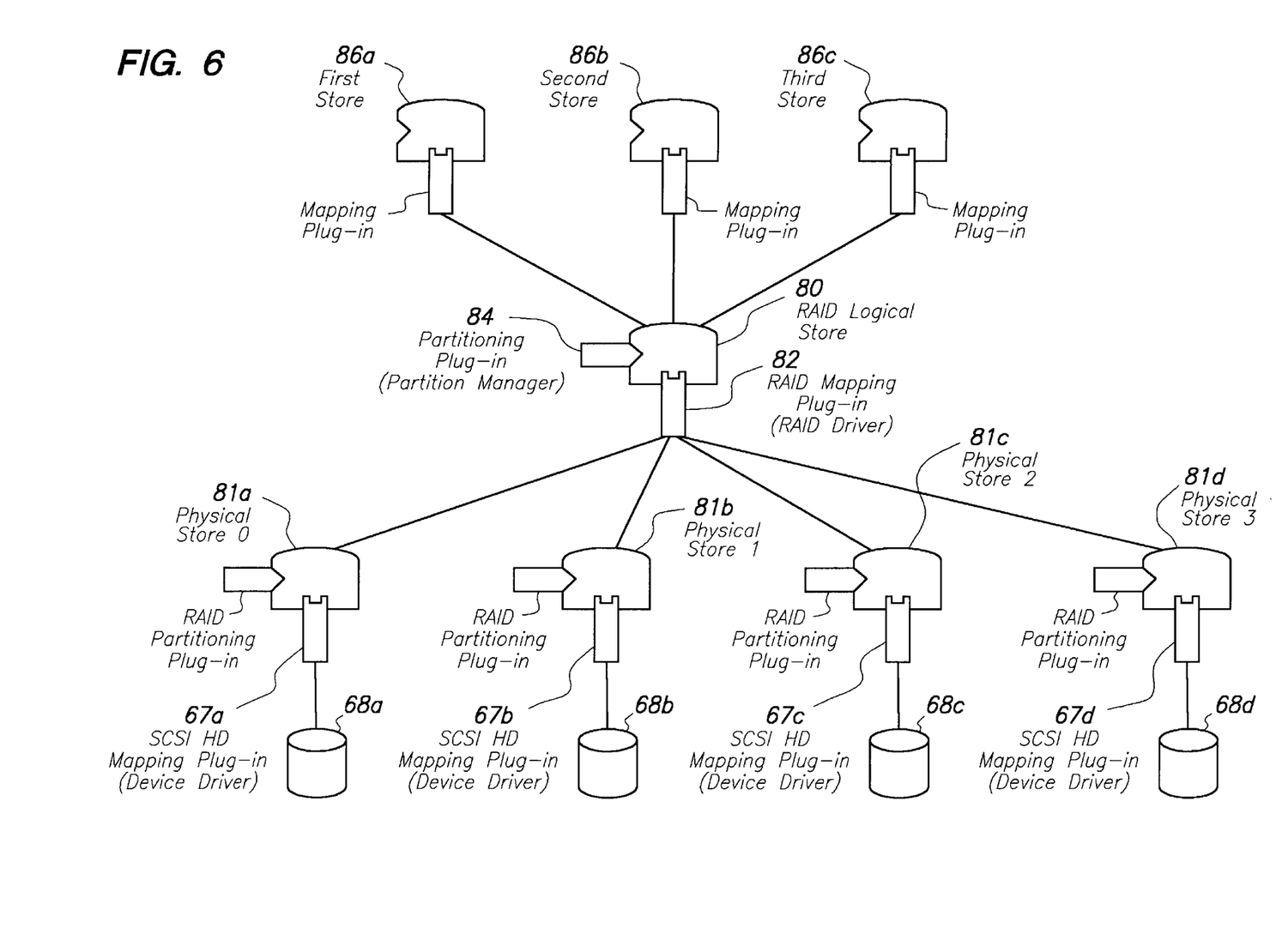
FIG. 6 shows a RAID hierarchy.

A store hierarchy for a storage system which includes one or more RAID devices is shown in FIG. 6. A RAID driver is implemented as a mapping plug-in 82 and is used at the logical store level with a RAID logical store 80. A RAID partitioning plug-in 84 stores, for RAID store 80, the information about its associated devices. Instantiation of the RAID store 80 is performed according to the block storage store instantiation method described earlier; that is, each store is identified and associated with a device driver, partition formats are determined, and new devices are generated. The RAID store 80 in this example contains first, second, and third stores 86a, b, and c as its children. The logical RAID store 80, while appearing as a single disk to the system user, is actually comprised of, in this example, four physical stores 81a, b, c, and d. The physical stores are each associated with a physical storage device 68a–d and a mapping plug-in (device driver) 67a–d.

A method of creating and using a block storage memory list according to an embodiment of the present invention will now be described with reference to FIG. 7. In step 100, a memory list range is defined using, for example, a starting virtual or physical address and a range length defined by a byte count.

Figure 8:
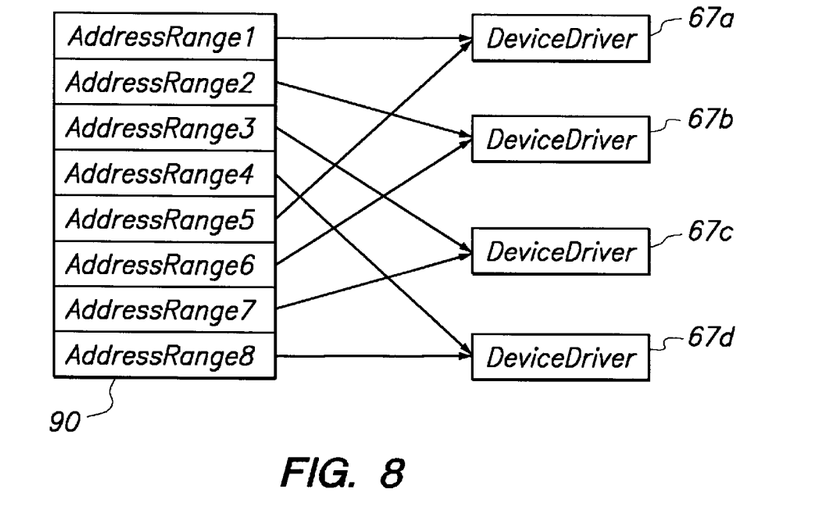
FIG. 8 is an illustration of an exemplary mapping between a memory list and the device drivers of FIG. 6.

In step 102, the memory list is initialized. Initialization is performed by first creating a memory list (that is, allocating a new memory list) from an anticipated or estimated number of ranges to be added to the memory list range defined in step 100. During initialization, any desired address range can be added to the memory list, based on the memory list to be added to, the starting address of the range in the address space, and the length of the range. The address ranges are preferably addressable from the address space specified by the memory list. Finally, the memory list is finalized by closing the memory list and creating an initial descriptor describing the memory list. The memory list includes one or more address ranges, as shown in FIG. 8, and the initial descriptor is typically a simple descriptor describing a starting or other position in the memory list and some length value to describe one or more positions in the memory list. Once finalized, no further address ranges can be added to the memory list. When all descriptors are deleted, the initial memory list will be deleted.

In step 104, one or more additional descriptors can be created or deleted. The one or more additional descriptors can be created from a base descriptor defining a base memory list (which can be a descriptor created in step 102), an offset defined as a beginning of an additional descriptor's memory list within the base descriptor's memory list, and a length of the area described by the additional descriptors. This step adds a descriptor to an existing memory list based upon a previously defined descriptor for the memory list, effectively creating a subset of the existing memory list. The additional descriptors can be simple descriptors or complex descriptors, as will be described in more detail below.

A previously-created descriptor can be deleted, in which case resources specifically tied to the descriptor are deallocated. Memory which has been made noncacheable ("locked") is returned to its original state, unless other descriptors in the same memory list require the memory to remain locked. If the descriptor is the last descriptor for a memory list, all resources for the memory list are deallocated.

A complex "stride" descriptor can be created in step 104, which is particularly useful for RAID storage systems. The complex descriptor creates a memory list, composed of every nth block having a block size specified by a granularity value, from the base descriptor. Preferably, the memory list described by the complex descriptor is computed on demand (that is, when a physical address is necessary) and requires no memory allocation when it is calculated or used. The complex descriptor can be created from, for example, a base descriptor, an offset value defining the beginning of the complex descriptor's memory list with the base descriptor's memory list, a length value specifying the length of the complex descriptor's memory list, the granularity value, and a stride value indicating the number of blocks to skip. The complex descriptor thus defines an algorithmic mapping between a second memory list and a first memory list. The algorithm enables the second memory list to be generated as follows: starting at block (or item) x in the first memory list described by the first descriptor, collect every nth block of a block size specified by the granularity value. This calculation of the second memory list is performed by the device driver associated with a physical store. Thus, the calculation is performed only when a physical address is necessary to retrieve data for transmission to a destination or to receive data transmitted from a source. This type of descriptor is particularly useful for RAID storage systems, or other storage systems where data is scattered throughout a memory system, such as in FIG. 6. According to the present invention, the algorithm contained in the complex descriptor is preferably not implemented to recover data from the second memory list until the data is necessary to perform an I/O operation. This is ensured by storing the complex descriptor in a physical store device driver, thereby avoiding the need to copy and store memory lists in each device driver at each hierarchical level, including in each of the multiple devices replaced by a RAID array. In the RAID array, a complex descriptor is preferably generated and stored in each device driver of each physical store.

In step 106, descriptor operations are performed. First, a memory list specified by a descriptor is prepared for I/O in a similar manner to preparing a memory for an I/O operation. A new descriptor and a mapped length are generated from an identification of the descriptor to be mapped, a granularity measure, a requested map length, and additional information defining how the memory is to be prepared (i.e., the specific operation to be performed, etc.). Caches are flushed appropriately, physical and logical addresses are translated as needed and pages may be invalidated from the cache. As described above, calculation of physical addresses is preferably performed only at the physical store level by the physical device drivers, thereby delaying the calculations until a physical address is necessary to perform the desired I/O operation. The reading or writing necessary for the I/O operation can be performed with the memory described by the descriptor, and when the operation is finished and the memory mappings no longer required, the descriptor is preferably deleted to free memory mappings and state.

As part of preparing the memory, a new memory descriptor is created. This descriptor holds memory preparation state information and is used to retrieve addresses. Multiple portions of a descriptor may be prepared. The new memory descriptor is a reference against the base memory list and is preferably deleted when no longer in use along with the memory list.

Descriptor operations in step 106 are performed as part of a memory system I/O operation. Specifically, referring for explanation purposes to FIGS. 1, 2, 6 and 8, a request for an I/O operation is generated by CPU 14 and supplied to file manager 40. The request includes source and destination addresses of a desired data block to be retrieved and the destination for the retrieved data, respectively. The addresses correspond to data associated with one or more of the first, second, or third virtual stores 86$a$, $b$, or $c$. The store or stores corresponding to the addresses perform memory mappings of the desired data block and destination addresses and provide the mappings to the next hierarchical level- in this case, to the RAID logical store 80.

Based on the received mapping, the device driver 82 of RAID store 80 sets up the next level of stores, which in this example are the physical stores 81$a$, $b$, $c$, and $d$ associated with the independent disks of the RAID array. It is assumed in this example that the desired data block is comprised of data which is "scattered" over the complete RAID array; that is, portions of the data comprising the requested block are physically located in each of the independent disks of the RAID array. Rather than copying the memory list associated with each requested block, and providing these memory lists to each of the device drivers 67$a$–$d$, the device driver 82 associated with RAID logical store 80 instead generates, in the manner described previously, complex "stride" descriptors for each of the device drivers 67$a$–$d$. Each stride descriptor includes an algorithm describing the portions of the mapped memory list (contained in RAID logical store 80) which contain addresses for data physically stored in its associated RAID physical store 81$a$–$d$.

For example, referring now to FIG. 8, assume the request corresponds to an 8K I/O operation involving eight 1K (kilobyte) blocks of physical data, and that the first and fifth blocks are physically stored in disk 68$a$, the second and sixth blocks are physically stored in disk 68$b$, the third and seventh blocks are stored in disk 68$c$, and the fourth and eighth blocks are stored in disk 68$d$. The memory list 90 stored in logical RAID store 80 includes address ranges AddressRange1 . . . 8, as shown in FIG. 8. The stride descriptor generated by RAID driver 82 and provided to device driver 67$a$ and physical store 81$a$, as an example, would algorithmically describe the memory list positions of entries AddressRange1 and AddressRange5, while the complex descriptor provided to device driver 67$b$ would algorithmically describe the memory list positions of entries AddressRange2 and AddressRange6, etc., as shown in FIG. 8.

The device drivers 67$a$–$d$ generate the sub-list described by their respective complex descriptors, and calculate the physical addresses (on disks 68a–d) of the data comprising the desired data block. The device drivers 67a–d receive the retrieved data, and perform the same address calculation to determine the physical destination address, and provide the appropriate instructions to the SCSI bus to send the data to the desired destination.

It will be appreciated that, as a result of separating the partition managers and the device drivers of each partitioned storage device in each hierarchical level of the block storage memory system, it is no longer necessary to inefficiently replicate and store irrelevant partition code in each partition manager or device driver of each device.

While the foregoing description includes numerous details and specificities, it is to be understood that these are for illustrative purposes only, and are not to be construed as limitations of the present invention. Many modifications will be readily apparent to those of ordinary skill in the art which do not depart from the spirit and scope of the present invention, as defined by the following claims and their legal equivalents.

What is claimed is:

1. A method of managing a memory system, comprising the steps of:

identifying a first storage device and a corresponding first device driver to scan the first storage device;

scanning the first storage device to determine its partitioning format;

if the first storage device is partitioned, generating, from a first partition map stored in a first partition manager associated with the first storage device, a plurality of second virtual storage devices, each having one or more second partitioning formats, a second partition manager, and a second device driver associated with the first storage device, wherein the first and second partition managers are independent of the first and second device drivers.

2. The method of claim 1, further comprising the steps of:

scanning one of the second storage devices to determine its second partitioning format using its associated second device driver; and generating, from a second partition map stored in an associated second partition manager, one or more third virtual storage devices each having one or more third partitioning formats, a third partition manager, and a third device driver.

3. The method of claim 2, wherein said first storage device is a physical storage device.

4. The method of claim 3, wherein the physical storage device includes at least one redundant array of independent disks.

5. The method of claim 3, wherein the first device driver is a SCSI interface.

6. A memory management system, comprising:

a plurality of physical storage media for storing memory data;

a memory manager for generating virtual storage devices containing addresses of memory data stored in the physical storage media, receiving requests to access data corresponding to a portion of the addresses, and accessing the requested data, wherein the virtual storage devices include:

one or more first virtual storage devices, each having a corresponding first device driver for interfacing with the plurality of storage media, each first device driver scanning its corresponding first virtual storage device to determine its partitioning format, and generating one or more second virtual storage devices from a partition map stored in a first partition manager associated with the corresponding first storage device;

each second virtual storage device having one or more second partitioning formats, a second partition manager, and a second device driver, each second device driver being associated with one of the one or more first virtual storage devices, and the first and second partition managers being independent of the first and second device drivers.

7. The memory management system of claim 6, wherein the physical storage media include at least one redundant array of independent disks.

8. The memory management system of claim 6, wherein each first device driver is a SCSI interface.

9. The memory management system of claim 6, wherein the first and second partition maps are different.

10. A storage medium for use in a computer system comprising:

means for generating one or more first virtual storage devices, each having a corresponding first device driver associated with one of a plurality of physical storage devices for scanning the corresponding first virtual storage device to determine its partitioning format and generating one or more second virtual storage devices from a first partition map stored in a first partition manager associated with the corresponding first virtual storage device; and means for generating one or more second virtual storage devices, each generated from a first partition map and having one or more second partitioning formats, a second partition manager, and a second device driver, each second device driver being associated with one of the one or more first virtual storage devices, and the first and second partition managers being independent of the first and second device drivers.

11. The storage medium of claim 10, wherein the physical storage devices include at least one redundant array of independent disks.

12. The storage medium of claim 10, wherein each first device driver is a SCSI interface.

13. The storage medium of claim 10, wherein the first and second partition maps are different.

* * * * *